United States Patent
Horentrup et al.

(10) Patent No.: US 9,578,301 B2
(45) Date of Patent: Feb. 21, 2017

(54) APPARATUS AND METHOD FOR DETECTING A TEMPORAL SYNCHRONIZATION MISMATCH BETWEEN A FIRST AND A SECOND VIDEO STREAM OF A 3D VIDEO CONTENT

(71) Applicant: THOMSON LICENSING, Issy de Moulineaux (FR)

(72) Inventors: Jobst Horentrup, Wennigsen (DE); Markus Schlosser, Hannover (DE)

(73) Assignee: THOMSON LICENSING SA, Issy les Moulineaux (FR)

( * ) Notice: Subject to any disclaimer, the term of this patent is extended or adjusted under 35 U.S.C. 154(b) by 314 days.

(21) Appl. No.: 14/367,913

(22) PCT Filed: Dec. 7, 2012

(86) PCT No.: PCT/EP2012/074775
§ 371 (c)(1),
(2) Date: Jun. 21, 2014

(87) PCT Pub. No.: WO2013/092248
PCT Pub. Date: Jun. 27, 2013

(65) Prior Publication Data
US 2014/0368611 A1    Dec. 18, 2014

(30) Foreign Application Priority Data
Dec. 21, 2011    (EP) .................................... 11306721

(51) Int. Cl.
H04N 15/00    (2006.01)
H04N 13/00    (2006.01)
G06K 9/00    (2006.01)

(52) U.S. Cl.
CPC ...... *H04N 13/0051* (2013.01); *G06K 9/00597* (2013.01); *H04N 2013/0096* (2013.01)

(58) Field of Classification Search
USPC .......................................................... 348/43
See application file for complete search history.

(56) References Cited

U.S. PATENT DOCUMENTS 6,340,991 B1    1/2002    Chen et al.
7,676,063 B2    3/2010    Cohen et al.
(Continued)

FOREIGN PATENT DOCUMENTS

CN    101505434    8/2009
EP    2259599    12/2010
(Continued)

OTHER PUBLICATIONS

Chau et al., "Real Time Eye Tracking and Blink Detection with USB Cameras", Boston University Computer Science Technical Report No. 2005-12, May 12, 2005, pp. 1-10.
(Continued)

*Primary Examiner* — Leron Beck
(74) *Attorney, Agent, or Firm* — Tutunjian & Bitetto, P.C.

(57) ABSTRACT

A video processing apparatus and a method for detecting a temporal synchronization mismatch between at least a first and a second video stream of a stereoscopic video content are described. An eye blink of a creature that is imaged in the video content is detected. The temporal synchronization mismatch is determined by determination of a temporal offset between the reproduction of an eye blink in the first video stream and the reproduction of said eye blink in the second video stream.

14 Claims, 4 Drawing Sheets

(56) References Cited

U.S. PATENT DOCUMENTS

| | | | |
|---|---|---|---|
| 2006/0149426 A1 | 7/2006 | Unkrich et al. | |
| 2008/0252745 A1 | 10/2008 | Nakamura | |
| 2010/0315337 A1 | 12/2010 | Ferren et al. | |
| 2011/0122315 A1* | 5/2011 | Schweiger | H04N 21/2365 348/500 |

FOREIGN PATENT DOCUMENTS

| | | |
|---|---|---|
| FR | 2875322 | 3/2006 |
| KR | 20010057239 | 7/2001 |

OTHER PUBLICATIONS

Anonymous, "LipTracker Lip Sync Analyzer", http://www.pixelinstruments.tv/liptracker.htm, Nov. 11, 2012, pp. 1-4.
Wang et al., "Eye Blink Detection Based on Eye Contour Extraction", Proceedings of the SPIE—The International Society for Optical Engineering, vol. 7245, Jan. 19, 2009, pp. 1-7.
Grauman K et al: "Communication via eye blinks-detection and duration analysis in real time", Proceedings 2001 IEEE Conf. on Computer Vision, Dec. 8-14, 2001, vol. 1, pp. 1010-1017* on whole document.
Search Report Dated Apr. 3, 2013.

\* cited by examiner

APPARATUS AND METHOD FOR DETECTING A TEMPORAL SYNCHRONIZATION MISMATCH BETWEEN A FIRST AND A SECOND VIDEO STREAM OF A 3D VIDEO CONTENT

This application claims the benefit, under 35 U.S.C. §365 of International Application PCT/EP2012/074775, filed Dec. 7, 2012, which was published in accordance with PCT Article 21(2) on Jun. 27, 2013 in English and which claims the benefit of European patent application No. 11306721.9, filed Dec. 21, 2011.

FIELD OF THE INVENTION

The invention relates to a method for detecting a temporal synchronization mismatch between at least a first and a second video stream of 3D video content. Further, the invention relates to a video processing apparatus for detecting a temporal synchronization mismatch in this stereoscopic video content.

BACKGROUND OF THE INVENTION

In 3D-video, each eye of the viewer receives its own stream of images. Each image pair in the stream represents the same scene from a slightly different perspective, creating a 3D experience in the human brain during reproduction. Typically, a pair of synchronized cameras is used for capturing stereoscopic 3D video content. One camera captures the images for the left eye, while the other camera captures the images for the right eye. In this context, 3D-video content is also referred to as stereoscopic video content. Due to the slightly different viewing direction of the left and a right camera in a stereoscopic camera arrangement there is a displacement between two corresponding points in the left and right image resulting from the different camera positions. This displacement between corresponding points in the captured images is commonly referred to as disparity.

To produce high quality stereoscopic video content, stereo cameras must be tightly synchronized so that each pair of images, i.e. the image or frame taken by the left camera and a corresponding image or frame taken by the right camera of a stereoscopic camera arrangement, are taken at the same moment in time. Otherwise camera motion and moving objects in the captured scene will lead to additional erroneous disparities. Human observers are well known to be very sensitive to even small amounts of erroneous vertical disparities. However, altered or erroneous horizontal disparities can also lead to severe distortions in the 3D reproduction of the video content. Further, an erroneous disparity between a left and a right picture in stereoscopic video content can lead to conflicts between monocular occlusions and stereoscopic placement cues as well as hyper-convergence or -divergence. These issues can easily lead to an unpleasant viewing experience similar to erroneous vertical disparities, especially as motion in films tends to be more pronounced in the horizontal direction.

In order to provide tight camera synchronization, stereo cameras are usually equipped with a "genlock" or "sync" input through which a central timing generator unit can send a common sync-signal to each of the cameras to trigger the two capturing processes in a synchronous manner. Nevertheless, a lot of 3D video content suffers from insufficient synchronization. The reasons are manifold and range from hardware failures and tolerances to operator mistakes and editing errors.

As a consequence, proper synchronization in the final stereoscopic video content is one critical area to take care of when producing high quality 3D content. According to the prior art, quality inspection with respect to synchronization is performed manually in most cases. However, this is a costly and time consuming process because the 3D content has to be inspected by an operator and synchronization mismatch has to be determined manually. Accordingly, there is a need for an automatic or semi-automatic inspection allowing detecting a synchronization mismatch in 3D content.

SUMMARY OF THE INVENTION

It is an object of the invention to provide an improved video processing apparatus and an improved method for detecting a temporal synchronization mismatch between at least a first and a second video stream of 3D video content.

In one aspect of the invention, a method for detecting a temporal synchronization mismatch between at least a first and second video stream of a 3D video content is provided. An eye blink of a creature that is imaged in the video content is detected. The temporal synchronization mismatch between the first and the second video stream is determined by determination of a temporal offset between the reproduction of the eye blink in the first video stream and a reproduction of said eye blink in the second video stream. In other words, the method according to aspects of the invention relies on the detection of eye blinks for the determination of a temporal synchronization mismatch between the first and the second video stream. This method may be implemented easily and robustly since the detection and tracking of faces, the estimation of the position of the eyes of a creature that may be human being, an animal or even a comic creature, as well as the determination of the direction of their gaze and the detection of eye blinks has long been an active area of research in the field of human machine interaction. This technical field is mature to an extent that modern digital cameras are equipped with face, smile and eye blink detectors. The latter can automatically trigger a second picture capture in case one of the photographed persons had the eye closed. In other words, the implementation of algorithms for the detection of eye blinks may be performed on the basis of a variety of different algorithms which are available "off the shelf". Subsequently, the result of said eye blink detection may be used for determination of the temporal synchronization mismatch.

The detection of eye blinks is advantageous for the detection of synchronization mismatch because the shape of an eye and the motion of the eye lid are well-defined and vary very little from one person to another. Furthermore, an eye blink results in a drastic change in color and contrast and is still visible from larger distance and under steep angles.

According to another aspect of the invention, the eye blink detection comprises the detection of an eye blink in at least the first and the second video stream. In other words, the eye blink detection is performed separately for each of the video streams which form part of the stereoscopic video content. Further, a first and a second moment in time of the reproduction of the eye blink in the first and the second video stream, respectively, is determined. The temporal synchronization mismatch is determined by comparing this first and second moment in time.

It is further advantageous if the detection of an eye blink in the first and the second video streams comprises the calculation of a temporal eye-blink-function for the first and the second video stream. The eye-blink-function may be indicative to a degree of closure or openness of at least one eye of the creature. The temporal synchronization mismatch may be determined by calculating a correlation between the time-resolved eye-blink-function of the first and the second video stream, wherein a maximum of the correlation function may be indicative to the synchronization mismatch. According to an embodiment of the invention, more than one eye-blink-function may be calculated for each video stream and a scene of the video.

First, plurality of eye blinks is detected in the first and the second video stream for a plurality of corresponding reproductions of eye blinks in the respective video streams. For example, a first eye-blink-function may be indicative to a degree of closure of the left eye of the creature and a second eye-blink-function may be indicative to a degree of closure of the right eye of this creature. A plurality of first and second moments in time is determined for the reproductions of corresponding eye blinks, wherein the temporal synchronization mismatch is determined by comparing the plurality of first and second moments in time for corresponding eye blinks and by performing an averaging step for the determined differences between the plurality of first and second moments. For example, a further third and fourth eye-blink-function may be calculated which may be indicative to a degree of openness of the left and right eye of the creature, respectively. According to an embodiment, this will result in a maximum of four eye-blink-functions for each creature and for each video stream of the 3D video content. Accordingly, a correlation between these four eye-blink-functions which have been determined for the first video stream and the respective further four eye-blink-functions which may be calculated analogously for the second video stream may be determined. This increased number of eye-blink-functions and the determination of four correlation functions between the respective eye-blink-functions will lead to higher robustness compared to the embodiment which applies only one eye-blink-function per video stream. However, the computational load will be slightly higher.

According to another aspect of the invention, the time-resolved eye-blink-function is determined by matching the reproduction of the at least one eye of the creature and a pre-determined eye template. The eye template can refer to an opened eye or to a closed eye, respectively. According to another embodiment of the invention, the eye template is updated using the reproduction of at least one eye of the creature in the first and/or second video stream of the stereoscopic video content. In other words, the pre-determined template may be applied at the beginning and may be refined using the captured information of the detected eyes of the first and second video stream. This will improve the results of the matching stage.

The time-resolved eye-blink-function may be a signal indicating the degree of eye closure in the form of the visible area of the eye, the height of the pupil or a matching score with the eye template.

Advantageously, the correlation between the eye-blink-function of the first video stream and the eye-blink-function of the second video stream allows a determination of the synchronization mismatch with sub-frame accuracy. This will be explained in the following paragraph.

Typically, the duration of an eye blink is between 300 and 400 milliseconds. This period is long enough for a camera (having a capture rate of e.g. only 24 frames per second) to capture a number of frames during the lid closing an opening process. A rough estimation results in about seven frames for a fast eye blink. In order to achieve sub frame accuracy, which seems to be a difficult task at a first glance, the eye-blink-function may be interpolated and accordingly a smooth curve taking into account the determined measurement points may be provided. Sub-frame accuracy may be achieved by correlating the interpolated eye-blink-function of the first video stream and the second video stream. According to another embodiment of the invention, the correlation function between the first and second eye-blink-function may be interpolated in order to achieve sub-frame accuracy. However, the first approach is expected to deliver more precise results.

According to another aspect of the invention, after detection of an eye blink in at least the first and the second video stream, a first frame of the first video stream and a corresponding second frame of the second video stream are selected for performing the step of determining the temporal synchronization mismatch. This first and second frame is taken from a set of frames, each preferably showing a complete reproduction of the eye blink. A reproduction of at least one of the creature's eyes in the first frame and a reproduction of said eye in the corresponding second frame are compared so as to determine a synchronization mismatch. In other words, in contrast to the above-mentioned aspects of the invention, there is no fixed and pre-determined template which is used for determining an eye-blink-function and subsequent determination of a synchronization mismatch. According to the mentioned aspect of the invention, the video information of the first video stream serves as template for the second video stream and/or vice versa. For high quality video content, the main difference between the first and second video stream should simply be a slight shift in perspective. Accordingly, there is no need for an adaption in size and/or rotation of a template and furthermore, the slight perspective distortion may be corrected by disparity compensation, according to further aspects of the invention.

According to another aspect of the invention, a first set of frames of the first video stream and a second set of corresponding frames of the second video stream are selected. The first and the second set of frames each preferably show a complete reproduction of half an eye blink from an opened-eye to a closed-eye or vice versa. Further, a difference image in luminance or color between the reproduction of the creature's eye in the first and the second frame of the first and second set of frames is calculated. This may be performed by simple subtraction and thresholding of the corresponding frames. Unfortunately, the size of the deviating area which is calculated from said difference will not only depend on the analyzed time offset but also on the blinking speed and the absolute size of the creature's eye in the frames. The latter may be removed by normalizing the calculated deviation areas. As far as the blinking speed is concerned, it has been recognized that the detected deviating areas may be accumulated over half a blink duration, i.e. for the time duration of an eye blink from an opened eye to a closed eye or vice versa. In other words, the deviating areas are summed up over the respective set of frames. Advantageously, after normalization of the deviating areas and after accumulation of the deviating areas, the resulting sum will directly indicate the frame offset.

However, there may be motion blur in the captured video content. Accordingly, the calculated difference between the reproduction of the creature's eye in the first and the second frame of the first and second set of frames, i.e. the deviation area may not be a sharp transition but a blurred transition including a gradient in a grayscale picture. To overcome this, a threshold filter may be applied to the calculated deviating area, wherein preferably, a threshold of 0.5 on a normalized 0 to 1 scale is applied.

According to another aspect of the invention, after calculating a difference image between the reproduction of the creature's eye in a first and the second frame of the first and second set of frames, respectively, a height between a lower eyelid and an upper eyelid is calculated from said difference. The calculated heights may be normalized. By summing up said heights, the synchronization mismatch may be determined in. This may be performed in a similar way as has been explained for the deviating areas.

Further, and according to still another aspect of the invention a difference between the reproduction of the creature's eye in a corresponding first and second frame of the first and second set of frames may be calculated. Further, a difference between the reproduction of the creature's eye in subsequent frames of the first and second set of frames may be calculated. The calculated difference for the corresponding frames may be divided by the calculated difference for subsequent frames so as to determine the synchronization mismatch. According to this advantageous aspect of the invention, no normalization of the calculated differences is necessary. There is a minimum of three frames necessary for this calculation. A first and a subsequent second frame of one of the video streams has to be taken into account. For one of these frames, a further and third corresponding frame from the other video stream is necessary. The calculated difference may be a differential area or a height between the upper and lower eyelid as mentioned before.

According to another aspect of the invention, a video processing apparatus for detecting a temporal synchronization mismatch between at least a first and a second video stream of a stereoscopic video content may be provided. The video processing apparatus may be configured to detect an eye blink of a creature that is imaged in the video content. Further, the video processing apparatus may be configured to determine the temporal synchronization mismatch between the first and the second video stream by determination of a temporal offset between the reproduction of the eye blink in the first video stream and the reproduction of said eye blink in the second video stream.

The video processing apparatus may be further configured to allow a simple and additional visual inspection, e. g. for quality control of the automated method for detecting the temporal synchronization mismatch. For example, the eye-blink-function and the correlation function between the eye-blink-functions of the first and the second video stream may be displayed in a suitable user interface. Accordingly, an operator can immediately detect and correct any system failures and may determine the synchronization mismatch manually, if necessary. Further, a quality check for the automated eye blink detection may be performed by inspecting the correlation function over time. Each detected eye blink will be accompanied by a broader or sharper peak in the correlation function and by having a short look at the video content itself, the operator may determine correct functionality of the implemented algorithms.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

According to a first embodiment of the invention, a time dependent eye-blink-function is calculated for a first and for a second video stream of a 3D video content and subsequently, a correlation between these two time dependent eye-blink-functions is calculated so as to determine a temporal synchronization mismatch between the first and the second video stream. For a determination of a time-resolved eye-blink-function, the eyes of a creature that is imaged in the 3D video content have to be located in a video sequence. This may be performed by application of well known algorithms. For example, the algorithm which is described in K. Graumann et al.: "Communication via Eye Blinks—Detection and Duration Analysis in Real Time", Proceedings of the IEEE Computer Vision and Pattern Recognition Conference (CVPR 2001), Vol. 2, pages 1110-1117 may be applied.

Figure 1:
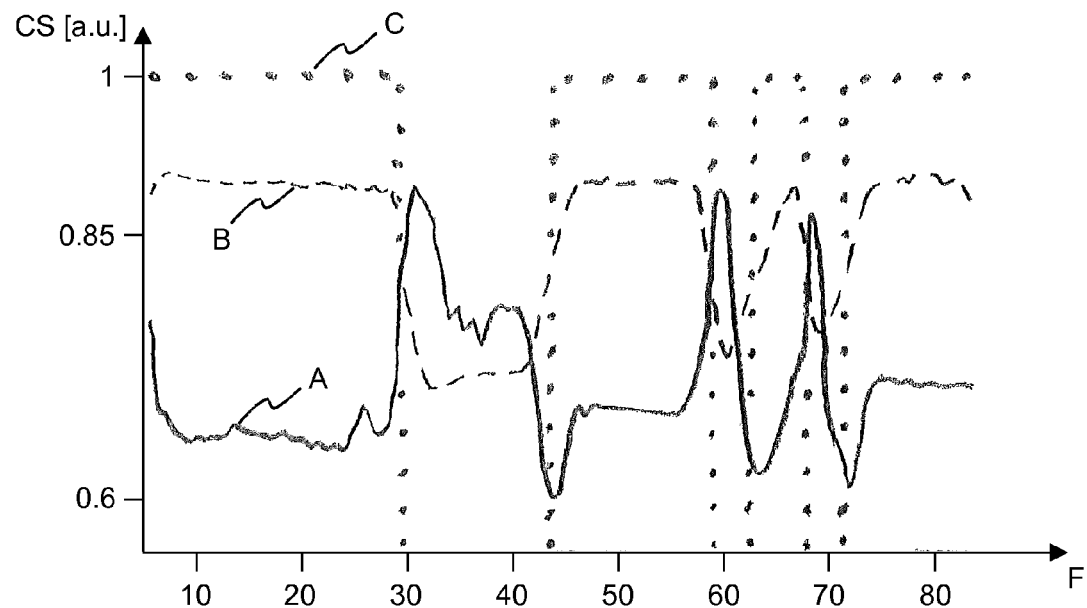
FIG. 1 is a simplified diagram showing a plurality of time dependent eye-blink-functions.

For determination of a time dependent eye-blink-function, a correlation score CS between a search region surrounding the location of the creature's eyes and a pre-determined eye-template may be determined. The pre-determined eye-template may be generated during an initialization step or may be taken from a database. As an eye closes, it starts to look less and less like an open eye, i.e. it starts to look less and less like the open eye-template. Likewise, it regains its similarity to the open eye slowly as it re-opens. This simple but powerful observation may be used to determine a first eye-blink-function A and a second eye-blink-function B which are drawn as a solid line and a dashed line in FIG. 1, respectively. FIG. 1 is taken from K. Graumann et al.: "Communication via Eye Blinks—Detection and Duration Analysis in Real Time", Proceedings of the IEEE Computer Vision and Pattern Recognition Conference (CVPR 2001), Vol. 2, pages 1110-1117. For generation of the first eye-blink-function A, the current reproduction of an eye is matched to an eye-template by calculating a correlation score between the current reproduction of an eye and an eye-template showing a closed eye is calculated. On the other hand, for generation of the second eye-blink-function B, a correlation score SC between the current reproduction of the eye and a template showing a opened eye is calculated.

According to the embodiment, the creature's eye, e.g. the eye of a person who is imaged in the respective scene, is opened during a first period of about 25 frames. Accordingly, the second eye-blink-function B is high and the first eye-blink-function A is low during this period of time. Upon a first eye blink, the first eye-blink-function steeply increases (at approximately frame 25) and the second eye-blink-function B decreases accordingly. When the creature re-opens the eye little later (at approximately frame 40), the second eye-blink-function B will increase again because the correlation score between the current image of the creature's eye in the search region of the video stream and the eye-template showing an opened eye increases again. Accordingly, the correlation score between the actual reproduction of the creature's eye and the eye-template showing a closed eye decreases again (see first eye-blink-function A).

For detection of eye blinks, a simple threshold may be applied to one or both of the eye-blink-functions A, B. According to the embodiment, this threshold is defined as a correlation score of 0.85 for the second eye-blink-function B. An eye-blink starts if the second eye-blink-function B falls beyond a correlation score CS of 0.85 and the eye is regarded to be open again if the second eye-blink-function B regains a correlation score CS of 0.85. Accordingly, periods of eye openness and periods of eye closure may be defined. These are defined by the eye openness function C (shown as a dotted line). This function is high or "1" if the second eye-blink-function B is greater than the correlation score threshold and low or "0" if the second eye-blink-function B is smaller than the threshold.

For determination of a temporal synchronization mismatch between the first and the second video stream, at least one of the time-resolved eye-blink-functions A, B will be determined for each of the video streams. If there is a temporal synchronization mismatch, the temporal offset may be determined by simply comparing the point in time for a falling and/or an increasing slope of the respective eye openness functions C, for the first and the second video stream. According to another embodiment of the invention, a correlation score between an eye-blink-function A, B of the first video stream and the second video stream may be calculated. For example, a correlation between the second eye-blink-function B of a left channel (representing a first video stream) and the second eye-blink-function B' of a right channel (representing a second video stream) of a 3D video stream may be calculated. This correlation function will show a maximum upon each occurring eye blink, if there is a temporal synchronization mismatch between the first and the second video stream, i.e. between the left and right channel.

In order to increase the accuracy of the determination of the temporal synchronization mismatch, the eye-blink-function A, B may be interpolated and a subsequent correlation between the eye-blink-functions for the first and second video stream may be calculated on a basis of the respective interpolated eye-blink-functions. Accordingly, a temporal synchronization mismatch between the first and the second video stream may be determined with sub frame accuracy. In order to reduce noise in the detection of the synchronization mismatch, more than one eye-blink-function A, B may be taken into account for determination of the temporal synchronization mismatch. For example, the eye-blink-function which is indicative to an eye closure (i.e. the first eye-blink-function A) and the eye-blink-function which is indicative to eye openness (i.e. the second eye-blink-function B) may be determined for each video stream. Accordingly, two matching functions may be calculated and the temporal synchronization mismatch may be determined by taking into account both matching functions.

Further, a respective first and second eye-blink-function A, B may be determined for each eye of the creature, for example for the left and right eye of a person. This will result in four eye-blink-functions per video stream and four matching functions, respectively. It might be even possible to calculate eye-blink-functions for more than one creature or person in a scene. However, suitable face detection and face recognition has to be performed in order to assign the respective eye pairs to the respective creatures in the first and second video stream.

According to another embodiment of the invention, the synchronization mismatch may be determined by calculating a difference between corresponding frames of the first and the second video stream. In other words, the reproduction of the creature's eye in one video stream can serve as a template for the other video stream. Before discussing this approach in more detail, there is a closer look at the reproduction of the creature's eye in the first and second video stream which is, by way of an example only, the left and right video stream of a 3D video content.

Figure 2:
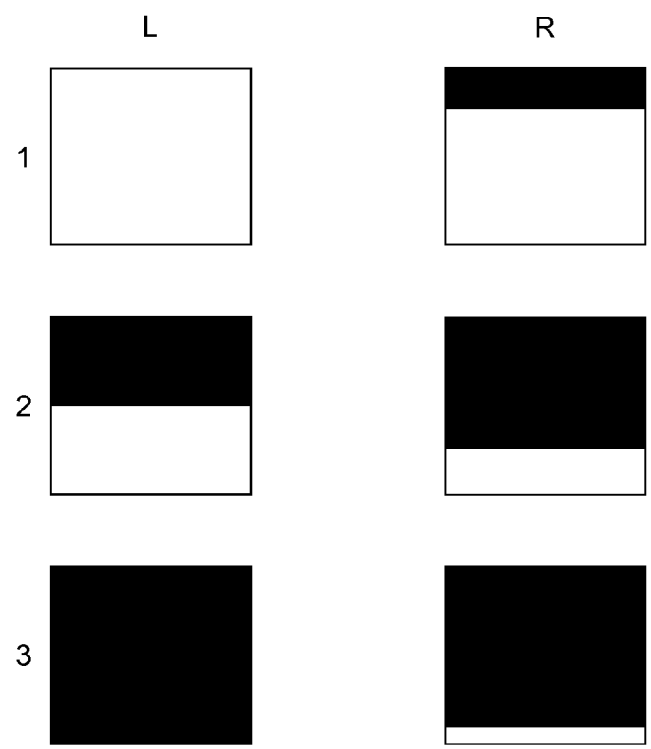
FIG. 2 is a simplified diagram illustrating a closing eye in a left video stream and a right video stream of a stereoscopic video content having a slight synchronization mismatch.

FIG. 2 is a simplified diagram illustrating a closing eye in the left video stream L and in the right video stream R, wherein this eye blink takes place during three frames 0 to 2. The left and right video stream L, R have a slight synchronization mismatch of 0.125 frames. It is understood the eye blink in FIG. 2, which takes place during three frames only, is a very fast example. However, for the sake of clarity it will be assumed that the eye-blink takes place during the frames 0 to 2. This example is for illustrating the working principle of the embodiment, however, it may be applied to arbitrary and more realistic eye-blinks taking place during a plurality of frame very easily. In a first frame (frame 0), the eye of the creature in the left video stream L is fully opened. Due to the synchronization mismatch, said eye is opened in the right video stream R to a degree of 0.9375 only. In a second frame (frame 1), the eye is half closed in the left video stream L while in the right video stream R the openness of the eye is only 0.4375. Finally, in the third frame (frame 2), the creature's eye is fully closed in the left video stream L while in the right video stream R it is slightly re-opened again and due to this, the openness of the creature's eye is 0.0625. The degree of eye openness for the left channel L and for the right channel R is summarized in the following table 1:

TABLE 1

| Frame | Degree of Eye Openness in the Left Channel | Degree of Eye Openness in the Right Channel |
|---|---|---|
| 0 | 1 | 0.9375 |
| 1 | 0.5 | 0.4375 |
| 2 | 0 | 0.0625 |

Figure 4:
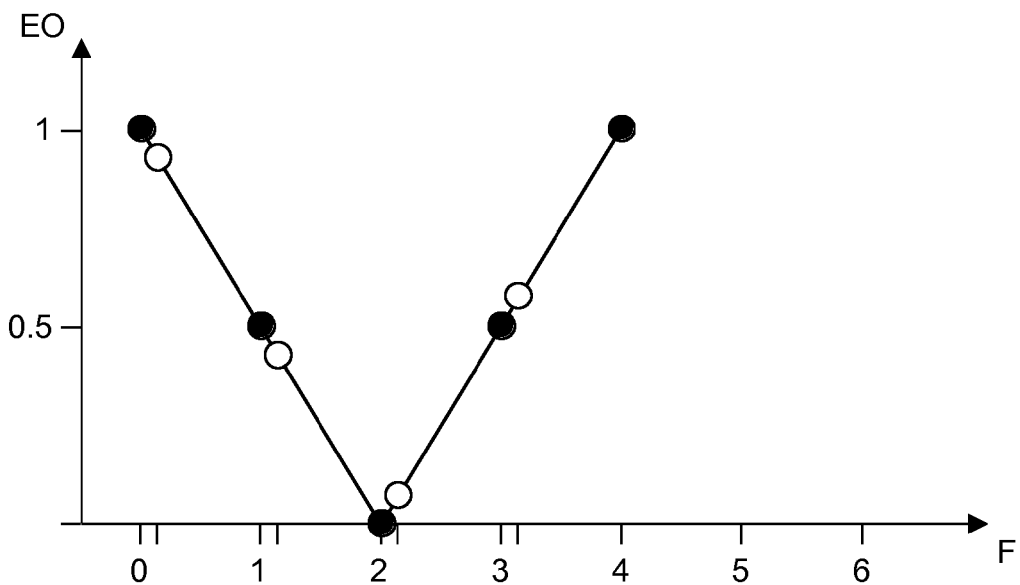
FIG. 4 is a diagram illustrating a degree of eye openness as a function of the captured frames showing the respective eye blink for a fast eye blink.

A further illustration of the time dependent degree of eye openness of the left channel L and the right channel R is given in the diagram of FIG. 4. There is a degree of eye openness EO which is a function of a number of frames F. The eye openness EO varies between "1" and "0" which indicates the opened eye and the closed eye, respectively. The eye openness EO is 1 at frame 0 in the left channel L. This is indicated by a solid dot. In frame 1, the eye openness is 0.5 and the creature's eye is closed (EO=0) in frame 2. Due to the slight temporal synchronization mismatch of 0.125 frames, the eye openness EO is slightly lower in the right video stream R, as it is indicated by hollow dots. The degree of eye openness EO may be calculated with sub-frame accuracy by determining the linear interpolation of the solid dots which results in the following formula:

$$EO = 1 - F/2 \qquad (1)$$

The degree of eye openness EO in Table 1 may be determined by help of this formula. For example, for the left channel L, the eye openness EO at frame 1 is 0.5. For calculation of the eye openness EO of the right channel R, the temporal synchronization mismatch of 0.125 has to be taken into account. Accordingly, the corresponding second frame (frame 1) of the right channel R is at F=1.125, which results in a degree of eye openness of EO=0.4375.

Figure 3:
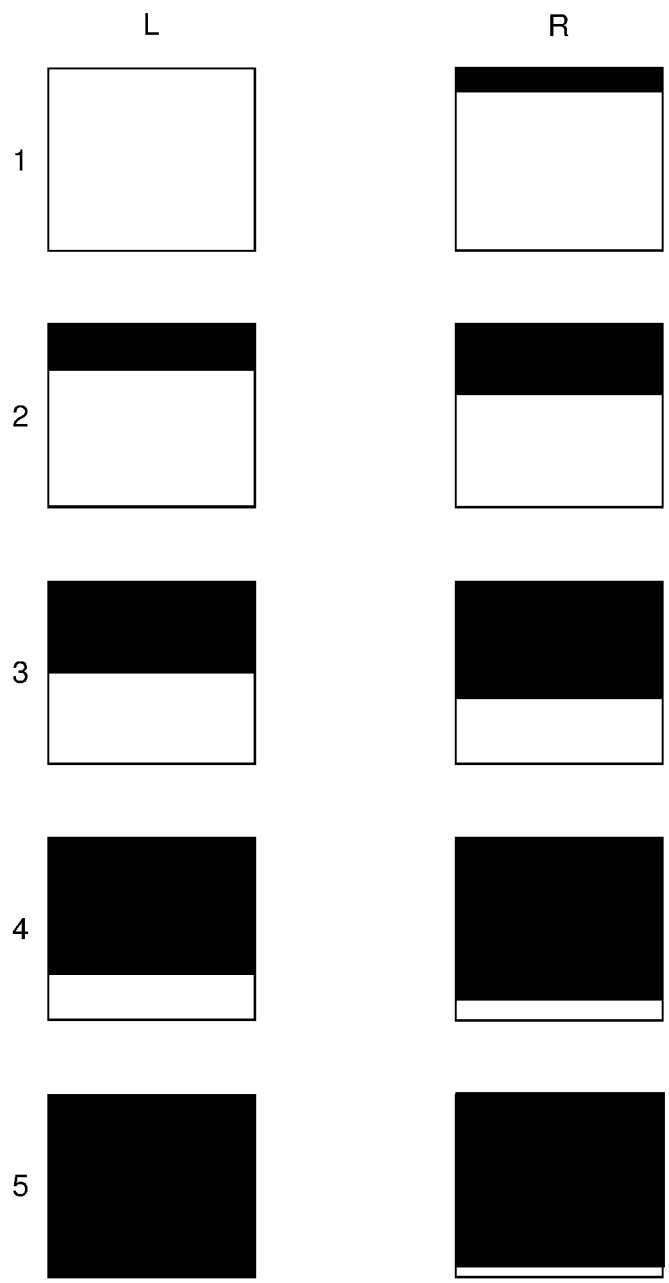
FIG. 3 is another simplified diagram illustrating a closing eye in a left video stream and right video stream of a stereoscopic video content having a slight synchronization mismatch.
Figure 5:
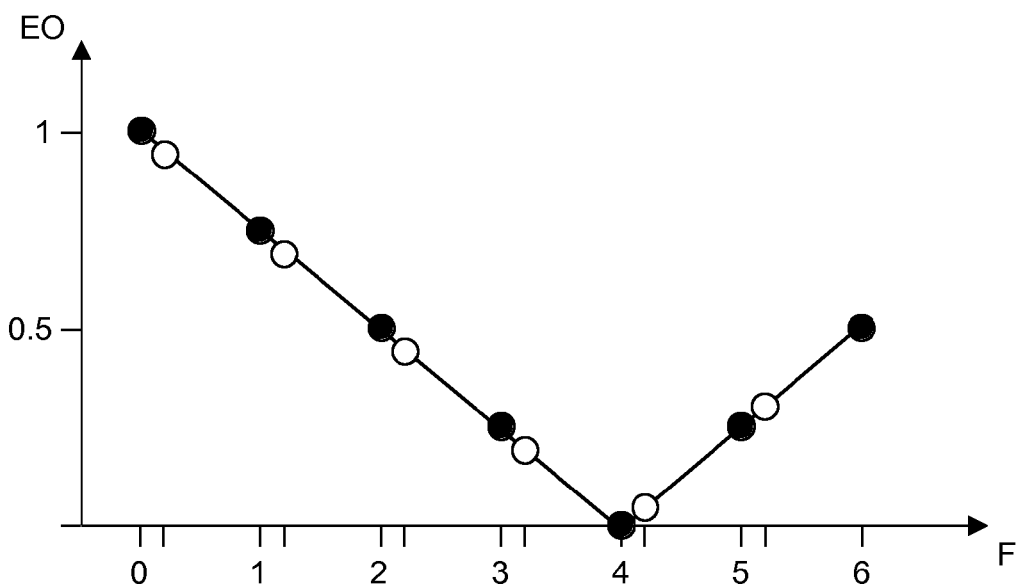
FIG. 5 is a diagram illustrating a degree of eye openness as a function of the captured frames showing the respective eye blink for a slow eye blink.

FIG. 2 and the corresponding FIG. 4 illustrate a fast eye blink which takes place during three frames only. FIGS. 3 and 5 are further corresponding figures illustrating a slower eye blink taking place during the five frames, i.e. during frames 0 to 4. FIG. 3 shows a plurality of simplified diagrams illustrating a slower eye blink, i.e. its reproduction in the left channel L and in the right channel R. The degree of eye openness for each of the frames is given by the following table 2, for the left and the right channel:

TABLE 2

| Frame | Degree of Eye Openness for the Left Channel | Degree of Eye Openness for the Right Channel |
|---|---|---|
| 0 | 1 | 0.96875 |
| 1 | 0.75 | 0.71875 |
| 2 | 0.5 | 0.46875 |
| 3 | 0.25 | 0.21875 |
| 4 | 0 | 0.03125 |

Again, FIG. 5 illustrates the degree of eye openness EO for the left channel L (solid dots) and the right channel R (hollow dots). Due to the temporal synchronization mismatch which is assumed to be 0.125 frames, too, the creature's eye is slightly more closed in the right channel R in comparison to the creature's eye in the left channel L. The degree of eye openness EO may be determined by calculating the interpolation function for the solid dots of frames 0 to 4 which is:

$$EO=1-F/4 \quad (2)$$

For determination of the temporal synchronization mismatch between the first and second video stream, a difference between the reproduction of the creature's eye in the left and the right video stream L, R may be determined by calculating a deviating area of the eye's reproduction in the left and the right channel L, R. In FIGS. 2 and 4, the difference between the eye openness EO in the left channel L and the eye openness EO in the right channel R is 0.0625. This may be derived from table 1 by simple determination of the difference of eye openness EO for the left and the right channel L, R. However, this deviating area depends on the speed of the eye blink which becomes obvious when taking a look at table 2 and calculating the difference of eye openness EO between the left and the right channel L, R which is 0.03125 only. However, by summing up said deviating areas for half an eye blink which means for all frames ranging from an opened eye to a closed eye or vice versa, the synchronization mismatch may be determined. According to the embodiments in FIGS. 2 to 5, the deviating areas have to be summed up for the frames 0 to 2 and for frames 0 to 4, respectively. According to the embodiment in FIGS. 2 and 4, this means summing up three times the difference of 0.0625 which results in 0.125. According to the embodiment in FIGS. 3 and 5, the difference of the degree of eye openness EO is 0.03125 which has to be taken five times. This will also result in 0.125 frames which is exactly the synchronization mismatch.

Further, the reproduction of the creature's eye may vary during an eye blink which means that the reproduction of the eye might be bigger or smaller at the beginning of the eye blink (in the respective frames) compared to the end of the eye blink. However, this may be resolved by normalizing the reproduction of the creature's eyes or by normalizing the deviating areas.

Figure 6:
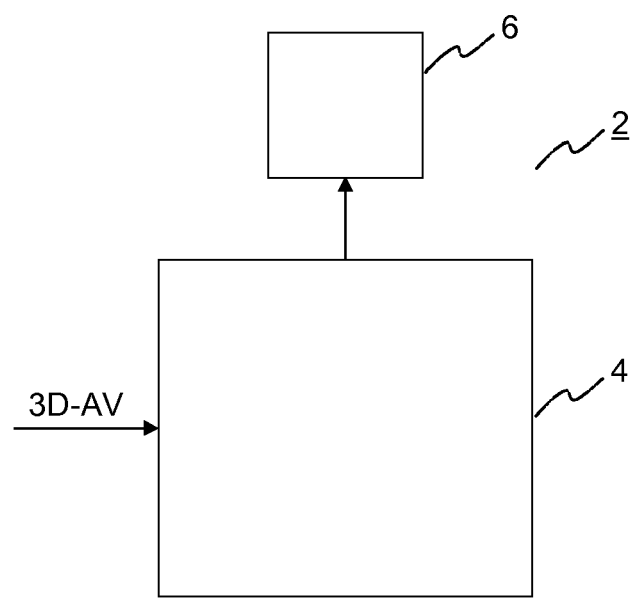
FIG. 6 is a simplified video processing apparatus for detecting a temporal synchronization mismatch between a first and a second video stream of stereoscopic video content.

FIG. 6 is a simplified video processing apparatus 2 comprising a processing unit 4 for receiving 3D video content (3D-AV). Further, a suitable display device 6 is coupled to the processing unit 4. The video processing apparatus 2 may be configured to perform the method according to aspects of the invention. Further, the video processing apparatus 2 may be configured to provide a suitable user interface which allows performing quality control of the automated method for detecting a temporal synchronization mismatch. For example, an operator may be provided with a reproduction of the stereoscopic video content and at the same time a reproduction of the matching function between the eye-blink-function for the left and right channel L, R. The matching function will show a smaller or broader maximum upon each detected eye blink and the operator may simply check the operation of the automated synchronization mismatch detection or may correct the synchronization mismatch manually.

Although the invention has been described hereinabove with reference to specific embodiments, it is not limited to these embodiments and no doubt further alternatives will occur to the skilled person that lie within the scope of the invention as claimed.

The invention claimed is:

1. A method for detecting a temporal synchronization mismatch between at least a first and a second video stream of 3D video content, the method comprising:
   detecting an eye blink of a creature in at least the first and the second video stream of the 3D video content; and
   determining the temporal synchronization mismatch between the first and the second video stream by determination of a temporal offset between the reproduction of the eye blink in the first video stream and the reproduction of said eye blink in the second video stream, the determining of the temporal synchronization mismatch comprising:
   selecting a first frame of the first video stream and a corresponding second frame of the second video stream, wherein the first frame and the corresponding second frames are taken from a first and second sets of frames, respectively, each first set and second set of frames shown a complete reproduction of the eye blink from opened eye to closed eye or vice versa,
   for all corresponding pair of frames of the first and second sets of frames, calculating a difference image in luminance or color between the reproduction of the creature's eye in the selected first frame and the corresponding second frames;
   for all corresponding pair of frames of the first and second sets of frames, calculating a height between a lower eyelid and an upper eyelid from said difference image; and
   summing up said heights to determine the temporal synchronization mismatch.

2. The method according to claim 1, wherein detecting an eye blink comprises:
   detecting an eye blink in at least the first and the second video stream; and determining a first and a second moment in time of the reproduction of the eye blink in the first and the second video stream.

3. The method according to claim 2, wherein detecting an eye blink in the first and the second video stream comprises:
calculating a temporal eye-blink-function for an eye blink process in the first and the second video stream, wherein the eye-blink-function is indicative to a degree of closure or openness of at least one eye of the creature.

4. The method according to claim 3, wherein the temporal eye-blink function is determined by calculating a matching score between the reproduction of the at least one eye of the creature and a predetermined eye-template.

5. The method according to claim 4, wherein the eye-template is updated using the reproduction of at least one eye of the creature in the first and/or second video stream of the stereoscopic video content.

6. The method according to claim 3, wherein a plurality of eye blinks is detected in at least the first and the second video stream for a plurality of corresponding reproductions of eye blinks in the respective video streams and a plurality of first and second moments in time is determined for the reproductions of corresponding eye blinks and wherein the temporal synchronization mismatch is determined by comparing the plurality of first and second moments in time for corresponding eye blinks and by performing an averaging step for the determined differences between the plurality of first and second moments.

7. The method according to claim 1, wherein calculating a height between a lower eyelid and an upper eyelid from said difference image comprises the step of normalizing the calculated heights.

8. A video processing apparatus for detecting a temporal synchronization mismatch between at least a first and a second video stream of a stereoscopic video content, wherein the video processing apparatus is configured to:
detect an eye blink of a creature that is imaged in at least the first and the second video stream of the stereoscopic video content; and
determine the temporal synchronization mismatch between the first and the second video stream by determination of a temporal offset between the reproduction of the eye blink in the first video stream and the reproduction of said eye blink in the second video stream, the determining of the temporal synchronization mismatch comprising:
selecting a first frame of the first video strew and a corresponding second frame of the second video stream, wherein the first frame and the corresponding second frames are taken from a first and second sets of frames, respectively, each first set and second set of frames showing a complete reproduction of the eye blink from opened eye to closed eye or vice versa,
for all corresponding pair of frames of the first and second sets of frames, calculating a difference image in luminance or color between the reproduction of the creature's eye in the selected first frame and the corresponding second frames;
for all corresponding pair of frames of the first and second sets of frames, calculating a height between a lower eyelid and an upper eyelid from said difference image; and
summing up said heights to determine the temporal synchronization mismatch.

9. The video processing apparatus according to claim 8, wherein detecting an eye blink comprises:
detecting an eye blink in at least the first and the second video stream; and
determining a first and a second moment in time of the reproduction of the eye blink in the first and the second video stream.

10. The video processing apparatus according to claim 9, wherein detecting an eye blink in the first and the second video stream comprises:
calculating a temporal eye-blink-function for an eye blink process in the first and the second video stream, wherein the eye-blink-function is indicative to a degree of closure or openness of at least one eye of the creature.

11. The video processing apparatus according to claim 10, wherein the temporal eye-blink function is determined by calculating a matching score between the reproduction of the at least one eye of the creature and a predetermined eye-template.

12. The video processing apparatus according to claim 11, wherein the eye-template is updated using the reproduction of at least one eye of the creature in the first and/or second video stream of the stereoscopic video content.

13. The video processing apparatus according to claim 10, wherein a plurality of eye blinks is detected in at least the first and the second video stream for a plurality of corresponding reproductions of eye blinks in the respective video streams and a plurality of first and second moments in time is determined for the reproductions of corresponding eye blinks and wherein the temporal synchronization mismatch is determined by comparing the plurality of first and second moments in time for corresponding eye blinks and by performing an averaging step for the determined differences between the plurality of first and second moments.

14. The video processing apparatus according to claim 8, wherein calculating a height between a lower eyelid and an upper eyelid from said difference image comprises the step of normalizing the calculated heights.

* * * * *